US008484222B1

(12) United States Patent
Li et al.

(10) Patent No.: US 8,484,222 B1
(45) Date of Patent: Jul. 9, 2013

(54) METHOD AND APPARATUS FOR IDENTIFYING A STANDALONE LOCATION

(75) Inventors: Xin Li, North Bergen, NJ (US); Jiang Qian, Pittsburgh, PA (US); Daniel T. Egnor, Palo Alto, CA (US); Lawrence E. Greenfield, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 152 days.

(21) Appl. No.: 11/607,568

(22) Filed: Dec. 1, 2006

(51) Int. Cl.
*G06F 17/30* (2006.01)
(52) U.S. Cl.
USPC .......................................... 707/748; 707/724
(58) Field of Classification Search
USPC ................. 704/8; 707/3, 10, 104.1, 729, 730, 707/706, 724, 748
See application file for complete search history.

(56) References Cited

U.S. PATENT DOCUMENTS

| | | | |
|---|---|---|---|
| 7,047,242 B1 * | 5/2006 | Ponte ............................... | 707/10 |
| 7,231,405 B2 * | 6/2007 | Xia ............................ | 707/104.1 |
| 7,774,348 B2 | 8/2010 | Delli Santi et al. | |
| 8,145,645 B2 | 3/2012 | Delli Santi et al. | |
| 2005/0065916 A1 * | 3/2005 | Ge et al. ............................. | 707/3 |
| 2005/0091209 A1 * | 4/2005 | Frank et al. ........................ | 707/3 |
| 2006/0085392 A1 * | 4/2006 | Wang et al. ........................ | 707/3 |
| 2006/0111893 A1 * | 5/2006 | Florian et al. ...................... | 704/8 |
| 2006/0149774 A1 | 7/2006 | Egnor | |
| 2008/0086468 A1 * | 4/2008 | Jing et al. .......................... | 707/5 |
| 2011/0231379 A1 | 9/2011 | Kruglick | |

\* cited by examiner

*Primary Examiner* — Huawen Peng
(74) *Attorney, Agent, or Firm* — McDermott Will & Emery LLP

(57) ABSTRACT

One embodiment of the present invention provides a system that automatically determines if a location is a standalone location, which can be unambiguously identified by a name for the location alone. During operation, the system determines a name score for the location which indicates a popularity of the name for the location. The system also obtains a signature for the location, wherein the signature is a set of combinations of location specifiers, wherein each combination of location specifiers refers to the location. The system then determines a signature score for the location which indicates a popularity of the signature for the location. Finally, the system determines whether the location is a standalone location based on the name score and the signature score.

24 Claims, 4 Drawing Sheets

METHOD AND APPARATUS FOR IDENTIFYING A STANDALONE LOCATION

BACKGROUND

1. Field of the Invention

The present invention relates generally to search engines. More specifically, the present invention relates to a method and an apparatus for identifying "standalone locations," what can be unambiguously identified by their names alone without additional location specifiers.

2. Related Art

Standalone locations are the locations that can be unambiguously identified by their names alone, either within a specific geographic region or globally. For example, the name "San Francisco" usually refers to "San Francisco, California, Unites States" even without additional location specifiers like "California", and "United States" (so it is standalone location). However, the name "Washington" as a location could refer to the "City of Washington" in the state of Missouri, "Washington, D.C." or "Washington State", so it is not strictly a standalone location in the United States. Moreover, a large number of locations are not standalone because they do not have names that uniquely identify them; an extreme case is the city of "Orange" in the state of Texas: just given its name, most people do not think it is a location.

Formally, a standalone location can be defined as follows: given a geographic-range R, a location L is standalone if and only if any location query on L can be unambiguously formulated by the query template {Query} {L} or {L} {Query} in R. For example, no matter where users are located, a search by a user for the hotels in "San Francisco" can be safely represented as "San Francisco Hotels" or "Hotels San Francisco". In contrast, "Orange Hotels"/"Hotels Orange" is pretty confusing; very few people could understand and actually use such queries.

The ability to identify names of standalone locations within a search query has a huge impact on quality of a search results generated by the query. Without such knowledge, the query processor cannot tell the difference between an obvious location query such as "new york pizza" (new york is a location) and an obvious non-location query such as "orange juice" (orange could be a location, but not here).

Furthermore, empirical measurements indicate that when users include location information in queries, more than 90% of the time this location information is specified using standalone location names. Hence, the ability to identify standalone location names in queries is of primary importance if location information is to be used while processing queries.

However, it is a hard problem to automatically determine whether or not a location is a standalone location. In general, the difficulty arises from the following two aspects: (1) there exists no appropriate knowledge base upon which to perform inferences; and (2) the concept itself has some ambiguity and it is consequently hard to formulate any uniform rules for determining whether a location is a standalone location. Note that this problem is even difficult for human beings because different people can have different criteria for determining whether a location is a standalone location.

To facilitate searching involving standalone locations, search engines presently use standalone city lists. However, the tasks of internationalizing and maintaining these standalone city lists are presently performed through labor-intensive and error-prone manual processes.

Hence, what is needed is a method and an apparatus for generating and maintaining a list of standalone locations without the above-described problems.

SUMMARY

One embodiment of the present invention provides a system that automatically determines if a location is a standalone location, which can be unambiguously identified by a name for the location alone. During operation, the system determines a name score for the location which indicates a popularity of the name for the location. The system also obtains a signature for the location, wherein the signature is a set of combinations of location specifiers, wherein each combination of location specifiers refers to the location. The system then determines a signature score for the location which indicates a popularity of the signature for the location. Finally, the system determines whether the location is a standalone location based on the name score and the signature score.

In a variation on this embodiment, determining the name score for the location involves using a search engine to determine an approximate number of pages which contain the name, and determining the signature score for the location involves using the search engine to determine an approximate number of pages which include at least one of the combinations of location specifiers in the signature. Note that the name score and the signature score can generally be determined based on any other indicators for the popularity of the name and the signature, not just the number of pages which contain the name and the signature.

In a variation on this embodiment, while determining whether the location is a standalone location, the system computes the ratio of the signature score to the name score. If this ratio is greater than or equal to a standalone threshold value, the system determines that the location is a standalone location. Otherwise, the system determines that the location is not a standalone location.

In a variation on this embodiment, if the location is a standalone location, the system additionally determines whether the location is a global standalone location by comparing the name score against a global threshold value. If the name score is greater than or equal to the global threshold value, the system determines that the location is a global standalone location which is recognized globally. Otherwise, the system determines that the location is a region-specific standalone location, which is recognized within a specific geographic region, such as a country.

In a variation on this embodiment, the format of the signature is determined by a country-specific and/or language-specific signature template.

In a variation on this embodiment, a given combination of location specifiers in the signature may or may not include the name of the location.

In a variation on this embodiment, the system assembles a list of locations which have been automatically determined to be standalone locations.

In a further variation, the system uses the list of standalone locations to process a query. During this process, the system receives a query comprised of search terms from a user. If a search term in the query is the name for a standalone location which appears in the list of standalone locations, the system uses location information for the location while producing and/or ranking search results for the query. Note that these search results can include web pages associated with search terms in the query. Finally, the system presents the search results to the user.

Figure 1:
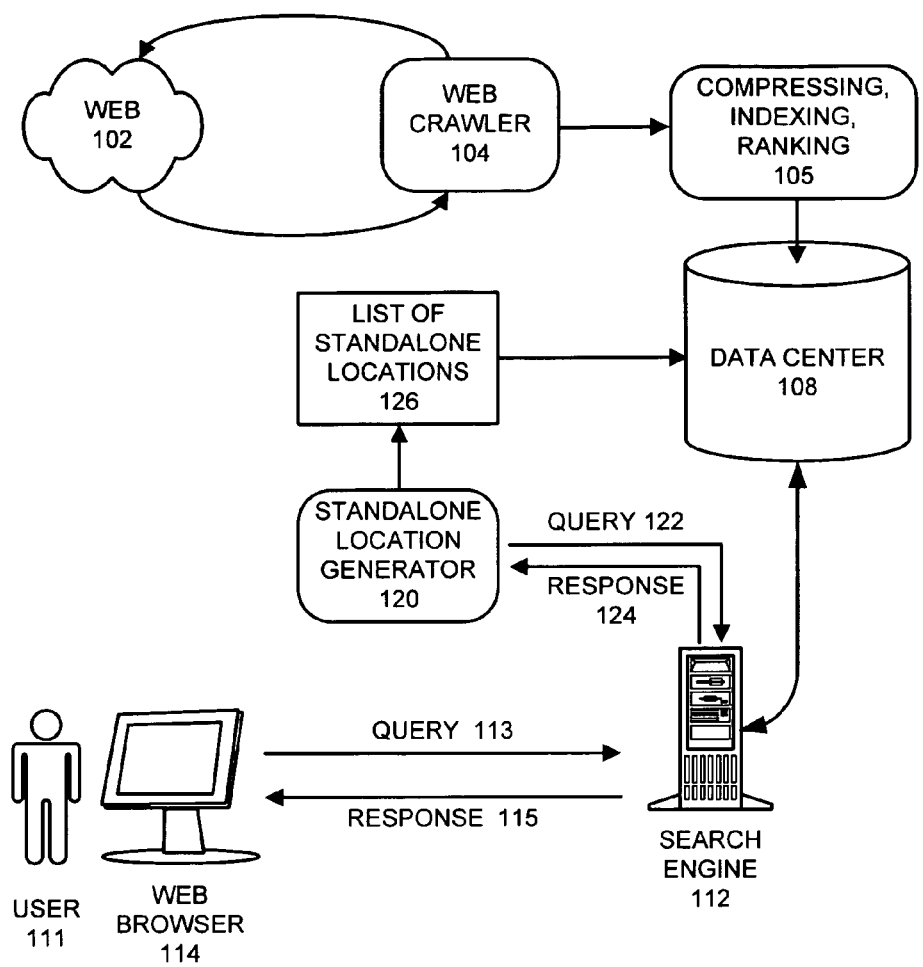
FIG. 1 illustrates the crawling, ranking and searching processes in accordance with an embodiment of the present invention.

Table 1 illustrates how the "Portland Problem" can be solved using page counts in accordance with an embodiment of the present invention.

Table 2 illustrates computational results for a number of cities in Texas in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

In one embodiment of the present invention, the system automatically identifies standalone locations by finding a set of relevant features, and building a model that can be used to infer which locations are "standalones" based on the relevant features. Several important location features have been tested. Depending on source of these features, they can be grouped into the following two categories:
 1. Geographic Attributes, e.g. area/size, population, intersections with other locations, and so on; and
 2. Location References, e.g. top N webpages from a search on the location-name using a search engine.

The relevance of the features to the standalone attributes has been evaluated against a set of human-rated testing data. Unfortunately, most features we have tested are either not relevant enough (such as location population/intersections), or are hard to analyze (e.g. top N webpages of search result). The results of these evaluations indicate that page counts of web search results are a very strong indicator of the prominence of a location.

For example, Table 1 presents an example which illustrates how we can use page counts to solve the well-known "Portland problem." This problem arises because two popular cities "Portland, Oregon" and "Portland, Maine" share the name, and they have comparable size and prominence. The question is if users just give us the name "Portland," which Portland is more likely to be the one they really mean? Table 1 illustrates how we can use the page count to find an answer.

TABLE 1

| Description | Total Page Count | Normalized Value |
|---|---|---|
| Search on "Portland" | 193,000,000 | 1.000 |
| Search on "Portland, Oregon" | 24,400,000 | 0.126 |
| Search on "Portland, Maine" | 6,520,000 | 0.034 |

Although these numbers may not be accurate enough for quantitative analysis (and they also change over the time), they strongly show that "Portland Oregon" is more prominent that "Portland Maine". As a result, we make can "Portland Oregon" the default choice for the word "Portland."

One embodiment of the present invention provides two range levels for the standalone locations: a global level and a region-specific level. A "global standalone location" can be recognized just by its name anywhere in the world. For example, the city names "Paris," "New York" and "Shanghai" are recognized globally. In contrast, a "region-specific standalone location", can be recognized just by its name in a specific geographic region, such as a country or a state. For example, Greenwich is a region-specific standalone location in England, and Portland is a region-specific standalone location in the United States. Finally, there exist locations which are "not standalone." These locations cannot be recognized just by their names alone. For example Orange (Texas, United States) and Sunrise (Florida, United States) are examples of locations which are not standalone.

Techniques for automatically determining whether a location is a standalone location are discussed in more detail below, but first we describe generally how a search engine operates.

Crawling, Ranking and Searching Processes

FIG. 1 illustrates the crawling, ranking and searching processes in for a search engine accordance with an embodiment of the present invention. During the crawling process, a web crawler 104 crawls or otherwise searches through websites on web 102 to select web pages to be stored in indexed form in data center 108. The selected web pages are then compressed, indexed and ranked in module 105 (using the ranking process described above) before being stored in data center 108.

During a subsequent search process, a search engine 112 receives a query 113 from a user 111 through a web browser 114. This query 113 specifies a number of terms to be searched for in the set of documents. In response to query 113, search engine 112 uses search terms specified in the query as well as synonyms for search terms to identify highly-ranked documents that satisfy the query. Search engine 112 then returns a response 115 through web browser 114, wherein the response 115 contains matching pages along with ranking information and references to the identified documents.

During the searching process, search engine 112 uses a list of standalone locations 126 to identify query terms that specify a location. This location information can be used to improve the searching process by narrowing the search to pages that are associated with the specific location, which is likely to make the search results more relevant for a user who is associated with the location. This location information can also be used to increase the ranking of pages associated with the specific location.

In one embodiment of the present invention, this list of standalone locations is automatically generated by a standalone location generator 120. During operation, standalone location generator 120 obtains information which is uses to determine whether a location is a standalone location from search engine 112. During this process, standalone location generator 120 sends queries, such as query 122, to search engine 112 and receives responses, such as response 124, from search engine 112. This automatic process is described in more detail below with reference to FIG. 2.

Determining Whether a Location is a Standalone Location

Figure 2:
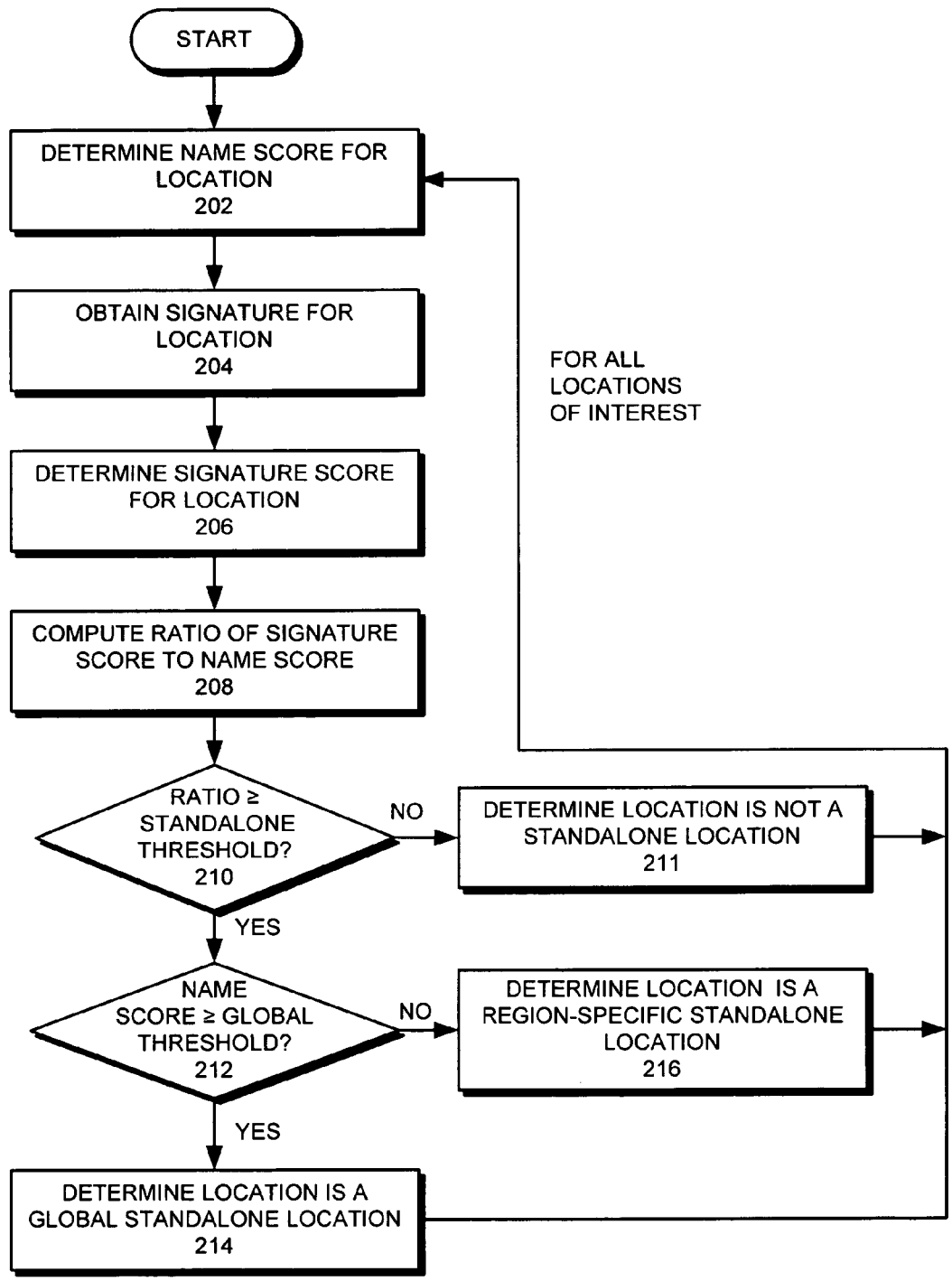
FIG. 2 presents a flow chart illustrating the process of determining whether a location is a standalone location in accordance with an embodiment of the present invention.

FIG. 2 presents a flow chart illustrating the process of determining whether a location is a standalone location in accordance with an embodiment of the present invention. During this process, the system determines a "name score" for the location by using a search engine to determine an approximate number of pages that contain the name (step 202).

The system also obtains or generates a "signature" for the location (step 204), wherein the signature is comprised of a set of combinations of locations specifiers, such as {"MountainView", "California", "United States of America"}, where each combination precisely refers to the location. Note that the format of the signature can be determined by a country-specific and/or language-specific signature template.

The system then determines a "signature score" for the location by using a search engine to determine an approximate number of pages which include at least one of the combinations of location specifiers in the signature (step 206).

The system then computes the ratio of the name score to the signature score (step 208). If this ratio is greater than or equal to a predefined "standalone threshold", such as 0.14, the location is a standalone location (step 210—yes). Otherwise, the system determines that the location is not a standalone location (step 211).

TABLE 2

| Location | Signature | Name Score | Signature Score | Ratio | Standalone Type |
|---|---|---|---|---|---|
| Houston | "Houston, TX" "Houston, Texas" | 283,000,000 | 81,800,000 | 0.289 | Global |
| Lubbock | "Lubbock, TX" "Lubbock, Texas" | 15,500,000 | 10,800,000 | 0.697 | Region |
| Harlingen | "Harlingen, TX" "Harlingen, Texas" | 105,700,000 | 1,692,000 | 0.158 | Region |
| Orange | "Orange, TX" "Orange, Texas" | 558,000,000 | 623,000 | 0.001 | Not |

If the location is a standalone location, the system next compares the name score for the location with a predefined "global threshold", such as 500,000 (step 212). If the name score is greater than or equal to the global threshold, the system determines that the location is a "global standalone location" (step 214). Otherwise, the system determines that the location is a "region-specific standalone location" (step 216), which only applies to a specific geographic region, such as a country.

For example, see Table 2 which illustrates computational results for a number of cities in the state of Texas. Note that the city of "Houston" is determined to be a global standalone location; the cities of "Lubbock" and "Harlingen" are determined to be region-specific (country-specific) standalone locations; and the city of "Orange" is determined to not be a standalone location.

Processing a Query Using Standalone Locations

Figure 3:
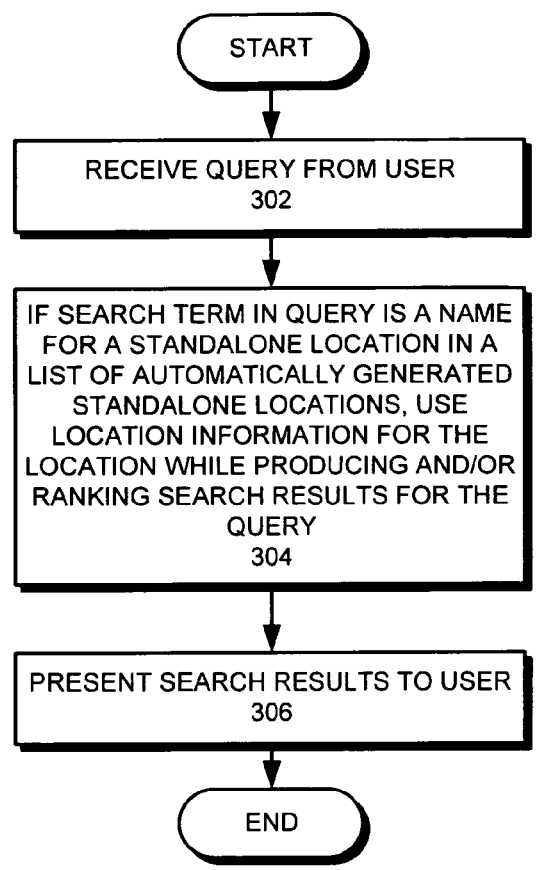
FIG. 3 presents a flow chart illustrating the process of using a list of standalone locations to process a query in accordance with an embodiment of the present invention.

FIG. 3 presents a flow chart illustrating the process of using a list of standalone locations to process a query in accordance with an embodiment of the present invention. During this process, the system receives a query comprised of search terms from a user (step 302). Next, if a search term in the query is the name for a standalone location which appears in the list of standalone locations, the system uses location information for the location while producing and/or ranking search results for the query (step 304). For example, these search results can include pages associated with search terms in the query. Finally, the system presents the search results to the user (step 306).

Experiments and Results

In order to verify the above approach, we selected 312 cities from the state of Texas in the United States to be used as training/testing data. All of these cities were rated by a human determine whether they are: (1) globally standalone, (2) country standalone, or not standalone.

Figure 4:
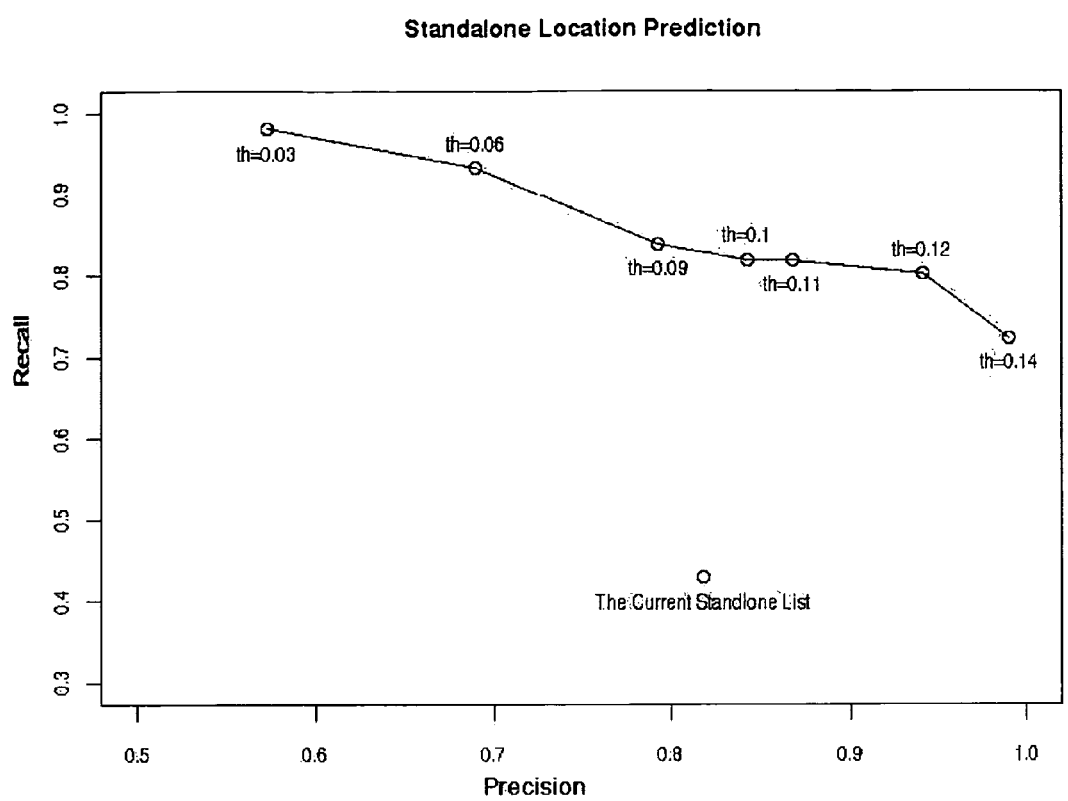
FIG. 4 depicts an example graph illustrating precision and recall for standalone location prediction for different standalone thresholds.

Next, a model was built based upon the data using the process described above. FIG. 4 shows the precision and recall for standalone location prediction for different standalone thresholds. Note that the abbreviation "th" in the graph refers to the standalone threshold. As illustrated in FIG. 4, an existing manually-generated standalone location list provides 43.8% recall and 81.8% precision when compared against the human-rated data. In contrast, the automatically generated list provides about 70% recall and close to 100% precision.

Note that the recall parameter indicates what percentage of standalone locations are identified as standalone, whereas the precision parameter indicates what percentage of locations which are identified as standalone locations are actually standalone locations. Also note that there exists a tradeoff between these two parameters. Hence, it is possible to tune the thresholds so that the model has a higher recall at the cost of sacrificing some precision.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for automatically determining if a location is a standalone location that can be identified by a name for the location, comprising:
   determining a name score for the location by determining an approximate number of pages that contain the name;
   generating a signature that includes the name for the location and an additional location specifier;
   determining a signature score for the location by determining an approximate number of pages that include the signature; and
   determining whether the location is a standalone location based on the name score and the signature score for the location by:
   computing a ratio of the signature score to the name score;
   if the ratio is greater than or equal to a standalone threshold value, determining that the location is a standalone location; and
   otherwise, determining that the location is not a standalone location.

2. The method of claim 1, wherein when the location is determined to be a standalone location, the method further comprises determining whether the location is a global standalone location, wherein the location is a global standalone location when the name score is greater than or equal to a global threshold value.

3. The method of claim 1, wherein when the location is determined to be a standalone location, the method further comprises determining whether the location is a region-specific standalone location, wherein the location is a region-specific standalone location when the name score is less than a global threshold value.

4. The method of claim 1, wherein the method further comprises determining a format of the signature using at least one of a country-specific or a language-specific signature template.

5. The method of claim 1, wherein when the location is determined to be a standalone location, the method further comprises adding the location to a list of standalone locations.

6. The method of claim 5, wherein the method further comprises:
  receiving a query comprised of search terms;
  if a search term in the query is the name for a standalone location that appears in the list of standalone locations, using location information for the standalone location while producing or ranking search results for the query; and
  presenting the search results.

7. An apparatus for automatically determining if a location is a standalone location that can be identified by a name for the location, comprising:
  a memory configured to store computer instructions;
  a processor coupled to the memory and configured to execute the instructions stored in the memory to:
    determine a name score for the location by determining an approximate number of pages that contain the name;
    generate a signature that includes the name of the location and an additional location specifier;
    determine a signature score for the location by determining an approximate number of pages that include the signature; and
    determine whether the location is a standalone location based on the name score and the signature score for the location by:
      computing a ratio of the signature score to the name score;
      if the ratio is greater than or equal to a standalone threshold value, determining that the location is a standalone location; and
      otherwise, determining that the location is not a standalone location.

8. The apparatus of claim 7, wherein when the location is determined to be a standalone location, the processor is further configured to execute instructions to determine whether the location is a global standalone location, wherein the location is a global standalone location when the name score is greater than or equal to a global threshold value.

9. The apparatus of claim 7, wherein when the location is determined to be a standalone location, the processor is further configured to execute instructions to determine whether the location is a region-specific standalone location, wherein the location is a region-specific standalone location when the name score is less than a global threshold value.

10. The apparatus of claim 7, wherein the processor is configured to execute instructions to determine a format of the signature using at least one of a country-specific or a language-specific signature template.

11. The apparatus of claim 7, wherein when the location is determined to be a standalone location, the processor is further configured to execute instructions to add the location to a list of standalone locations.

12. The apparatus of the 11, wherein the processor is further configured to execute instructions to:
  receive a query comprised of search terms;
  if a search term in the query is the name for a standalone location that appears in the list of standalone locations, use location information for the standalone location while producing or ranking search results for the query; and
  present the search results.

13. A method for processing a query, comprising:
  receiving a search query containing at least one search term;
  determining whether the at least one search term is a standalone location by searching a repository of standalone locations for the at least one search term;
  wherein the repository contains a plurality of terms identified as standalone locations, each term having a ratio of a signature score to a name score that is greater than a standalone threshold value; and
  wherein the name score refers to an approximate number of documents in a corpus of documents that contain the term and the signature score refers to an approximate number of documents in the corpus of documents that include the term and an additional term that specifies a geographic location;
  retrieving location information for the standalone location if the at least one search term is a standalone location; and
  using the location information to produce search results for the search query.

14. The method of claim 13, wherein using the location to produce search results for the search query comprises using the location information to limit the search results to search results that are associated with a location that is close to the standalone location.

15. The method of claim 13, wherein using the location to produce search results for the search query comprises using the location information to rank the search results obtained for the search query.

16. A computer-readable storage medium that includes instructions that, when executed by a processor, cause the processor to perform a method for automatically determining if a location is a standalone location that can be identified by a name for the location, the method comprising:
  determining a name score for the location by determining an approximate number of pages that contain the name;
  generating a signature that includes the name for the location and an additional location specifier;
  determining a signature score for the location by determining an approximate number of pages that include the signature; and
  determining whether the location is a standalone location based on the name score and the signature score for the location by:
    computing a ratio of the signature score to the name score;
    if the ratio is greater than or equal to a standalone threshold value, determining that the location is a standalone location; and
    otherwise, determining that the location is not a standalone location.

17. The computer-readable storage medium of claim 16, wherein when the location is determined to be a standalone location, the method further comprises determining whether the location is a global standalone location, wherein the location is a global standalone location when the name score is greater than or equal to a global threshold value.

18. The computer-readable storage medium of claim 16, wherein when the location is determined to be a standalone location, the method further comprises determining whether the location is a region-specific standalone location, wherein the location is a region-specific standalone location when the name score is less than a global threshold value.

19. The computer-readable storage medium of claim 16, wherein the method further comprises determining a format of the signature using at least one of a country-specific or a language-specific signature template.

20. The computer-readable storage medium of claim 16, wherein when the location is determined to be a standalone location, the method further comprises adding the location to a list of standalone locations.

21. The computer-readable storage medium of the 20, wherein the method further comprises:
   receiving a query comprised of search terms;
   if a search term in the query is the name for a standalone location that appears in the list of standalone locations, using location information for the standalone location while producing or ranking search results for the query; and
   presenting the search results.

22. A method for automatically determining if a phrase for a geographic location refers to a standalone location, comprising:
   determining a name score for the phrase by determining an approximate number of documents in a corpus of documents that contain the phrase;
   generating a signature for the phrase that includes at least one location specifier in addition to the phrase;
   determining a signature score for the phrase by determining an approximate number of documents in the corpus of documents that contains the signature for the phrase; and
   determining whether the phrase refers to a standalone location based on the name score and the signature score by:
   computing a ratio of the signature score to the name score;
   if the ratio is greater than or equal to a standalone threshold value, determining that the phrase for the geographic location refers to a standalone location; and
   otherwise, determining that the phrase for the geographic location does not refer to a standalone location.

23. The method of claim 22, wherein the corpus of documents comprises documents crawled on the World Wide Web.

24. The method of claim 22, further comprising adding the phrase to a repository storing the names of standalone locations if it is determined that the phrase refers to a standalone location.

* * * * *